US008620564B2

(12) United States Patent
Hakariya et al.

(10) Patent No.: US 8,620,564 B2
(45) Date of Patent: Dec. 31, 2013

(54) ABNORMALITY DETECTION APPARATUS AND ABNORMALITY DETECTION METHOD FOR MULTI-CYLINDER INTERNAL COMBUSTION ENGINE

(75) Inventors: Masashi Hakariya, Nagoya (JP); Isao Nakajima, Toyota (JP); Yoshihisa Oda, Toyota (JP); Hitoshi Tanaka, Nisshin (JP); Kiyotaka Kushihama, Nagoya (JP); Shota Kitano, Toyota (JP); Kazuyuki Noda, Toyota (JP); Katsumi Adachi, Toyota (JP); Yuichi Kohara, Toyota (JP); Akihiro Katayama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 3 days.

(21) Appl. No.: 13/480,921

(22) Filed: May 25, 2012

(65) Prior Publication Data

US 2012/0303248 A1 Nov. 29, 2012

(30) Foreign Application Priority Data

May 26, 2011 (JP) ................................ 2011-118133

(51) Int. Cl.

| | |
|---|---|
| ***B60T 7/12*** | (2006.01) |
| ***G05D 1/00*** | (2006.01) |
| ***G06F 7/00*** | (2006.01) |
| ***G06F 17/00*** | (2006.01) |

(52) U.S. Cl.
USPC ........... 701/104; 701/102; 701/103; 123/673; 123/674; 123/681; 73/114.22; 73/114.25

(58) Field of Classification Search
USPC ........ 701/102–104; 123/673–684; 73/114.02, 73/114.22, 114.25, 114.26, 114.31
See application file for complete search history.

(56) References Cited

U.S. PATENT DOCUMENTS

| | | | | |
|---|---|---|---|---|
| 5,440,922 | A * | 8/1995 | Ichikawa | 73/114.04 |
| 5,539,644 | A * | 7/1996 | Ichikawa et al. | 701/111 |
| 6,732,042 | B2 | 5/2004 | Katayama | |

(Continued)

FOREIGN PATENT DOCUMENTS

| | | | |
|---|---|---|---|
| JP | 10009040 | A | 1/1998 |
| JP | 2002-047996 | A | 2/2002 |

(Continued)

OTHER PUBLICATIONS

Japanese Office Action issued Jul. 31, 2012 in corresponding Japanese Patent Application No. 2011-118133 and partial English translation thereof.

*Primary Examiner* — Stephen K Cronin
*Assistant Examiner* — Joseph Dallo
(74) *Attorney, Agent, or Firm* — Gifford, Krass, Sprinkle, Anderson & Citkowski, P.C.

(57) ABSTRACT

An abnormality detection apparatus for a multi-cylinder internal combustion engine changes a fuel injection quantity of a predetermined target cylinder to detect an abnormality of an internal combustion engine based on values of rotational variations relating to the target cylinder detected before and after the change of the fuel injection quantity. The abnormality detection apparatus corrects the values of the rotational variations relating to the target cylinder detected before and after the change of the fuel injection quantity based on at least one of the number of revolutions of the engine and an engine load at a corresponding detection time.

5 Claims, 9 Drawing Sheets

(56) References Cited

U.S. PATENT DOCUMENTS

| | | | | |
|---|---|---|---|---|
| 7,243,532 | B2 * | 7/2007 | Tsujimura et al. | 73/114.02 |
| 8,281,650 | B2 * | 10/2012 | Kushihama et al. | 73/114.04 |
| 2002/0016666 | A1 | 2/2002 | Maegawa | |
| 2003/0159677 | A1 | 8/2003 | Uhl | |
| 2005/0193804 | A1 | 9/2005 | Kokubo | |
| 2011/0054761 | A1 | 3/2011 | Sawada et al. | |
| 2011/0118953 | A1 * | 5/2011 | Duval et al. | 701/102 |
| 2012/0024274 | A1 * | 2/2012 | Hakariya et al. | 123/704 |
| 2012/0253642 | A1 * | 10/2012 | Kitano et al. | 701/104 |
| 2012/0277979 | A1 * | 11/2012 | Kato et al. | 701/104 |
| 2012/0297866 | A1 * | 11/2012 | Tanaka et al. | 73/114.31 |

FOREIGN PATENT DOCUMENTS

| | | | |
|---|---|---|---|
| JP | 2003-343340 | A | 12/2003 |
| JP | 2005-248909 | A | 9/2005 |
| JP | 2010-112244 | A | 5/2010 |
| JP | 2011-047332 | A | 3/2011 |

* cited by examiner

ABNORMALITY DETECTION APPARATUS AND ABNORMALITY DETECTION METHOD FOR MULTI-CYLINDER INTERNAL COMBUSTION ENGINE

CROSS REFERENCE TO RELATED APPLICATIONS

This application claims priority to Japanese Patent Application No. 2011-118133 filed on May 26, 2011, which is incorporated herein by reference in its entirety including the specification, drawings and abstract.

BACKGROUND OF THE INVENTION

1. Field of the Invention

The invention relates to an abnormality detection apparatus and an abnormality detection method for a multi-cylinder internal combustion engine, and more particularly to an apparatus and a method for detecting a relatively large variation in air-fuel ratio between cylinders in a multi-cylinder internal combustion engine.

2. Description of Related Art

In general, in an internal combustion engine equipped with an exhaust gas control system that utilizes a catalyst, in order to perform purification of a pollutant in exhaust gas by a catalyst at high efficiency, it is essential to control a mixing ratio between air and fuel of an air-fuel mixture burned in an internal combustion engine, i.e., an air-fuel ratio. In order to control the air-fuel ratio, an air-fuel ratio sensor is provided in an exhaust passage of the internal combustion engine and feedback control is performed such that the air-fuel ratio detected by the air-fuel ratio sensor is caused to match with a predetermined target air-fuel ratio.

On the other hand, in a multi-cylinder internal combustion engine, air-fuel ratio control is usually performed on all cylinders by using the same control amount. Therefore, even when the air-fuel ratio control is executed, there are cases where the actual air-fuel ratio varies between the cylinders. At this point, when the degree of the variation is small, the variation can be compensated by air-fuel ratio feedback control, and the pollutant in exhaust gas can be purified by the catalyst so that the variation does not affect exhaust emission and does not present a problem.

However, for example, when a fuel injection system of a part of the cylinders fails and the variation in air-fuel ratio between the cylinders is thereby increased, the variation deteriorates the exhaust emission and presents a problem. The large variation in air-fuel ratio that deteriorates the exhaust emission is desirably detected as an abnormality. In particular, in the case of a vehicle internal combustion engine, in order to prevent the running of a vehicle with deteriorated exhaust emission beforehand, it is required to detect the abnormal variation in air-fuel ratio between the cylinders in an on-board state (so-called OBD; On-Board Diagnostics).

For example, in an apparatus described in Japanese Patent Application Publication No. 2010-112244 (JP-2010-112244 A), when it is determined that an abnormal air-fuel ratio occurs in any of cylinders, an injection time period, during which fuel is injected to each cylinder, is reduced by a predetermined time period until a misfire occurs in the cylinder with the abnormal air-fuel ratio, and the abnormal cylinder is thereby identified.

In the case where the abnormal air-fuel ratio occurs in any of cylinders, when the fuel injection quantity of the cylinder is forcibly changed (increased or reduced), the rotational variation relating to the cylinder is significantly increased.

Consequently, by detecting the increase in rotational variation, it is possible to detect the abnormality of the internal combustion engine, particularly the abnormal variation in air-fuel ratio between the cylinders of the internal combustion engine. Specifically, the fuel injection quantity of a predetermined target cylinder is changed and, based on the rotational variations relating to the target cylinder detected before and after the changing, it is possible to detect the abnormal variation in air-fuel ratio between the cylinders.

However, when the fuel injection quantity is changed, there is a case where the operation condition of the internal combustion engine is changed from that before the change. Therefore, in this case, values of the rotational variations detected before and after the change are values detected under different operation conditions so that abnormality detection based on the values may not be performed with sufficient accuracy.

SUMMARY OF THE INVENTION

The invention provides an abnormality detection apparatus and an abnormality detection method for a multi-cylinder internal combustion engine, which secure sufficient detection accuracy.

A first aspect of the invention relates to an abnormality detection apparatus for a multi-cylinder internal combustion engine. The abnormality detection apparatus includes an abnormality detection portion that changes a fuel injection quantity of a predetermined target cylinder and detects an abnormality of an internal combustion engine based on values of rotational variations relating to the target cylinder detected before and after the change of the fuel injection quantity; and a correction portion that executes correction to correct each of the values of the rotational variations relating to the target cylinder detected before and after the change of the fuel injection quantity based on at least one of the number of revolution of the engine and an engine load at a corresponding detection time.

The correction portion may execute the correction to correct each of the values of the rotational variations relating to the target cylinder detected before and after the change of the fuel injection quantity such that each of the values matches with a value obtained on an assumption that at least one of the number of revolutions of the engine and the engine load at the corresponding detection time is equal to a predetermined standard value.

The correction portion may execute the correction based on at least the number of revolutions of the engine, and may execute the correction such that, as a value of the number of revolutions of the engine at the time of detection of the rotational variation increases from a standard value, the value of the detected rotational variation is increased.

The correction portion may execute the correction based on at least the engine load, and may execute the correction such that, as a value of the engine load at the time of detection of the rotational variation increases from a standard value, the value of the detected rotational variation is decreased.

The abnormality detection portion may detect an abnormal variation in air-fuel ratio between cylinders in the internal combustion engine.

The abnormality detection portion may detect an abnormal air-fuel ratio shift of the target cylinder based on a difference in the value of the rotational variation relating to the target cylinder between before and after the change of the fuel injection quantity after the correction is executed by the correction portion.

A second aspect of the invention relates to an abnormality detection apparatus for a multi-cylinder internal combustion engine. The abnormality detection apparatus includes an abnormality detection portion that changes a fuel injection quantity of a predetermined target cylinder and detects an abnormality of an internal combustion engine based on values of rotational variations relating to the target cylinder detected before and after the change of the fuel injection quantity; and a normalization portion that executes normalization to normalize each of the values of the rotational variations relating to the target cylinder detected before and after the change of the fuel injection quantity based on a value of a criterion rotational variation corresponding to at least one of the number of revolutions of the engine and an engine load at a corresponding detection time.

A relationship between the criterion rotational variation and at least one of the number of revolutions of the engine and the engine load may be pre-stored in the normalization portion, and the normalization portion may calculate the value of the criterion rotational variation corresponding to at least one of the number of revolutions of the engine and the engine load at each detection time, from the relationship.

The normalization portion may execute the normalization by dividing each of the values of the detected rotational variations by the value of the criterion rotational variation.

The abnormality detection portion may detect an abnormal variation in air-fuel ratio between cylinders in the internal combustion engine.

The abnormality detection portion may detect an abnormal air-fuel ratio shift of the target cylinder based on a difference in the value of the rotational variation relating to the target cylinder between before and after the change of the fuel injection quantity after the normalization is executed by the normalization portion.

A third aspect of the invention relates to an abnormality detection method for a multi-cylinder internal combustion engine. The abnormality detection method includes changing a fuel injection quantity of a predetermined target cylinder; detecting rotational variations relating to the target cylinder before and after the change of the fuel injection quantity; executing correction to correct each of values of the rotational variations relating to the target cylinder detected before and after the change of the fuel injection quantity based on at least one of the number of revolutions of the engine and an engine load at a corresponding detection time; and detecting an abnormality of the engine based on the corrected values of the rotational variations relating to the target cylinder before and after the change of the fuel injection quantity.

A fourth aspect of the invention relates to, an abnormality detection method for a multi-cylinder internal combustion engine. The abnormality detection method includes changing a fuel injection quantity of a predetermined target cylinder; detecting rotational variations relating to the target cylinder before and after the change of the fuel injection quantity; executing normalization to normalize each of values of the rotational variations relating to the target cylinder detected before and after the change of the fuel injection quantity based on a value of a criterion rotational variation corresponding to at least one of the number of revolutions of the engine and an engine load at a corresponding detection time; and detecting an abnormality of the engine based on the normalized values of the rotational variations relating to the target cylinder before and after the change of the fuel injection quantity.

According to the above-described aspects of the invention, there is achieved an excellent effect that sufficient detection accuracy can be secured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENT

A description is given hereinbelow of an embodiment of the invention on the basis of the accompanying drawings.

Figure 1:
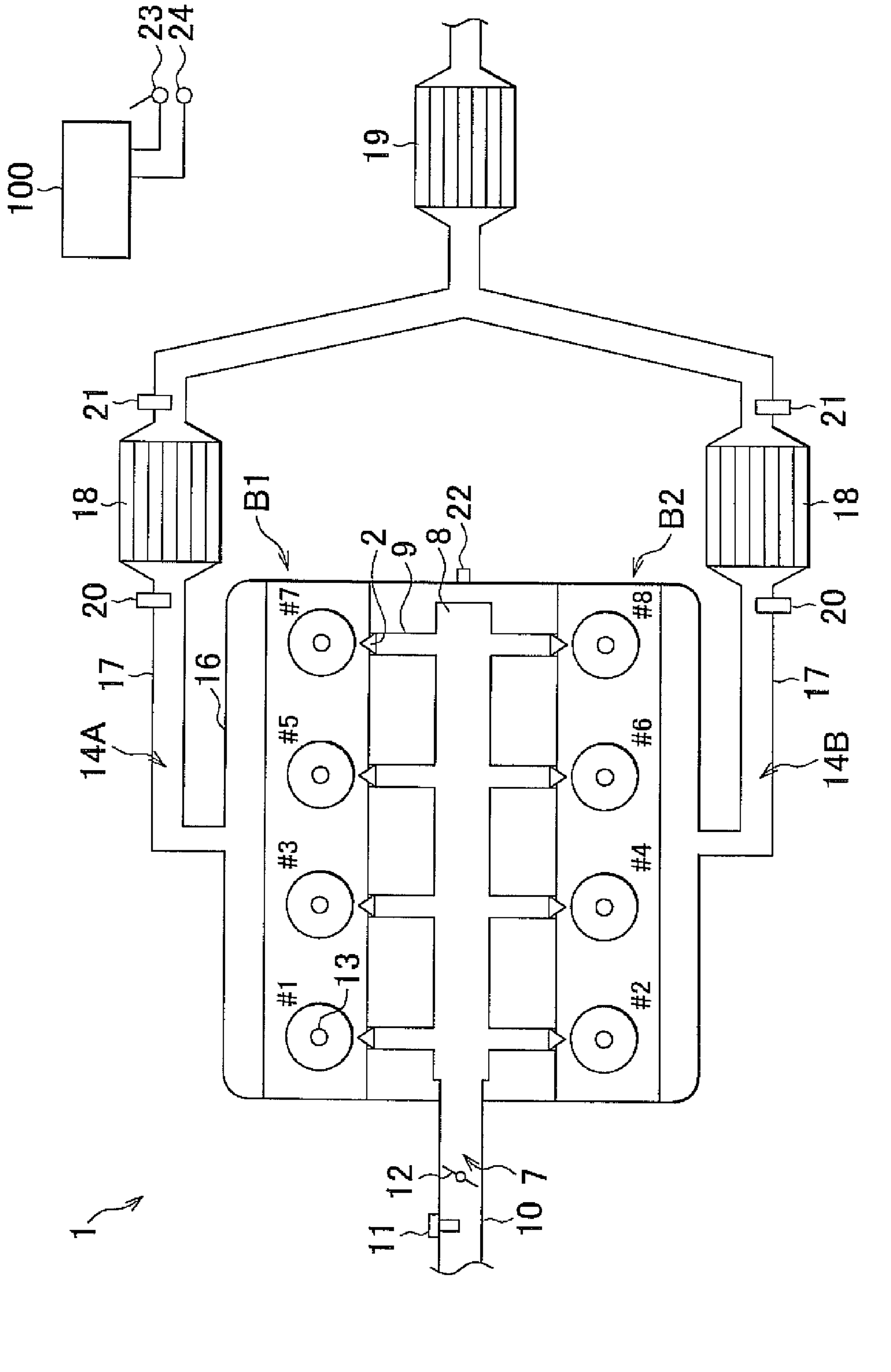
FIG. 1 is a schematic diagram of an internal combustion engine according to an embodiment of the invention.

FIG. 1 schematically shows an internal combustion engine according to the embodiment. An internal combustion engine (engine) 1 shown in the drawing is a V-type eight-cylinder spark ignition internal combustion engine (gasoline engine) mounted on a vehicle. The engine 1 includes a first bank B1 and a second bank B2, the first bank B1 includes odd-numbered cylinders, i.e., the #1, #3, #5, and #7 cylinders, and the second bank B2 includes even-numbered cylinders, i.e., the #2, #4, #6, and #8 cylinders. The #1, #3, #5, and #7 cylinders constitute a first cylinder group, while the #2, #4, #6, and #8 cylinders constitute a second cylinder group.

An injector (fuel injection valve) 2 is provided for each cylinder. The injector 2 injects fuel toward an intake passage for the corresponding cylinder, an intake port (not shown) in particular. In addition, each cylinder is provided with a spark plug 13 for igniting an air-fuel mixture in the cylinder.

An intake passage 7 for introducing air includes, in addition to the intake port, a surge tank 8 as a collective portion, an intake manifold 9 that connects the intake ports of the individual cylinders and the surge tank 8, and an intake pipe 10 on the upstream side of the surge tank 8. In the intake pipe 10, an air flow meter 11 and an electronically controlled throttle valve 12 are provided from the upstream side in this order. The air flow meter 11 outputs a signal having magnitude in accordance with an intake air flow rate.

A first exhaust passage 14A is provided for the first bank B1, and a second exhaust passage 14B is provided for the second bank B2. The first and second exhaust passages 14A and 14B join together on the upstream side of a downstream catalyst 19. The structure of the exhaust system of the upstream side of the joining position is the same in both banks so that only the structure of the first bank B1 side is described herein and the description of the structure of the second bank B2 side is omitted by assigning the same reference numerals in the drawings.

The first exhaust passage 14A includes exhaust ports (not shown) of the #1, #3, #5, and #7 cylinders, an exhaust manifold 16 that collects exhaust gas from the exhaust ports, and an exhaust pipe 17 disposed on the downstream side of the exhaust manifold 16. Further, an upstream catalyst 18 is provided in the exhaust pipe 17. A pre-catalyst sensor 20 and a post-catalyst sensor 21 each as an air-fuel ratio sensor for detecting the air-fuel ratio of the exhaust gas are provided on the upstream side and the downstream side of (immediately before and immediately after) the upstream catalyst 18. Thus, one upstream catalyst 18, and one pre-catalyst sensor 20 and one post-catalyst sensor 21 are provided for a plurality of cylinders (or the cylinder group) belonging to one of the banks.

Note that it is also possible to provide the downstream catalyst 19 in each of the first and second exhaust passages 14A and 14B without causing the first and second exhaust passages 14A and 14B to join together.

In the engine 1, there is provided an electronic control unit (hereinafter referred to as an ECU) 100 as a control portion and a detection portion. The ECU 100 includes a central processing unit (CPU), a read-only memory (ROM), a random access memory (RAM), an input/output port, and a storage device that are not shown. To the ECU 100, in addition to the air flow meter 11, the pre-catalyst sensor 20, and the post-catalyst sensor 21 that are described above, a crank angle sensor 22 for detecting a crank angle of the engine 1, an accelerator operation amount sensor 23 for detecting an accelerator operation amount, a coolant temperature sensor 24 for detecting the temperature of engine coolant, and other various sensors are electrically connected via an analog-to digital (A/D) converter that is not shown or the like. On the basis of detected values of various sensors, the ECU 100 controls, for example, the injectors 2, the spark plugs 13, and the throttle valve 12 to control the fuel injection quantity, fuel injection timing, ignition timing, and the throttle opening degree such that a desired output is obtained.

A throttle opening degree sensor (not shown) is provided for the throttle valve 12, and a signal from the throttle opening degree sensor is sent to the ECU 100. The ECU 100 usually controls, through feedback, the opening degree of the throttle valve 12 (the throttle opening degree) such that the opening degree thereof is set to an opening degree determined in accordance with the accelerator operation amount.

In addition, the ECU 100 detects a quantity of intake air per unit time, i.e., an intake air quantity based on a signal from the air flow meter 11. Further, the ECU 100 detects a load of the engine 1 (engine load) based on at least one of the detected accelerator operation amount, throttle opening degree, and intake air quantity.

On the basis of a crank pulse signal from the crank angle sensor 22, the ECU 100 detects the crank angle itself, and also detects the number of revolutions of the engine 1 (the number of revolutions of the engine). The "number of revolutions" mentioned herein means the number of revolutions per unit time, and is synonymous with a rotation speed. In the embodiment, the number of revolutions denotes the number of revolutions per minute, i.e., rpm.

Figure 2:
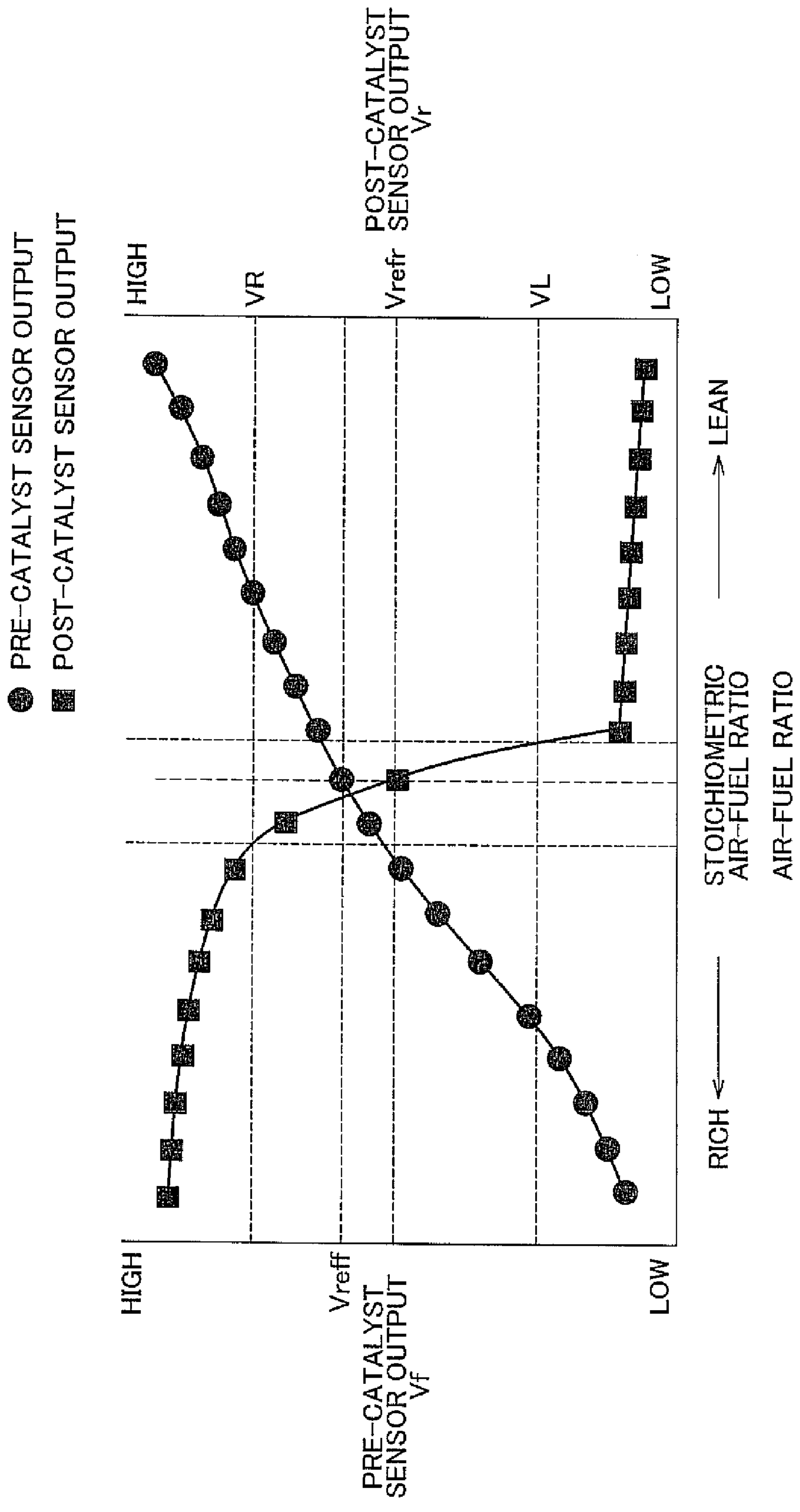
FIG. 2 is a graph showing output characteristics of a pre-catalyst sensor and a post-catalyst sensor.

The pre-catalyst sensor 20 is constituted by a so-called wide-range air-fuel ratio sensor, and is capable of continuously detecting the air-fuel ratio over a relatively wide range. FIG. 2 shows output characteristics of the pre-catalyst sensor 20. As shown in the drawing, the pre-catalyst sensor 20 outputs a voltage signal Vf having magnitude proportional to a detected exhaust air-fuel ratio (pre-catalyst air-fuel ratio A/Ff). An output voltage when the exhaust air-fuel ratio corresponds to the stoichiometric air-fuel ratio (e.g., A/F=14.5) is Vreff (e.g., about 3.3 V).

On the other hand, the post-catalyst sensor 21 is constituted by a so-called O2 sensor, and has characteristics in which an output value sharply changes around the stoichiometric air-fuel ratio. FIG. 2 shows output characteristics of the post-catalyst sensor 21. As shown in the drawing, an output voltage when the exhaust air-fuel ratio (a post-catalyst air-fuel ratio A/Fr) corresponds to the stoichiometric air-fuel ratio, i.e., a stoichiometric corresponding value is Vrefr (e.g., about 0.45 V). The output voltage of the post-catalyst sensor 21 changes in a predetermined range (e.g., 0 to 1 V). In general, when the exhaust air-fuel ratio is leaner than the stoichiometric air-fuel ratio, an output voltage Vr of the post-catalyst sensor is lower than the stoichiometric corresponding value Vrefr and, when the exhaust air-fuel ratio is richer than the stoichiometric air-fuel ratio, the output voltage Vr of the post-catalyst sensor is higher than the stoichiometric corresponding value Vrefr.

Each of the upstream catalyst 18 and the downstream catalyst 19 is constituted by a three-way catalyst, and simultaneously purifies $NO_x$, HC, and CO as pollutants in exhaust gas when an air-fuel ratio A/F of the exhaust gas flowing into each of the upstream and downstream catalysts 18 and 19 is in the vicinity of the stoichiometric air-fuel ratio. The range (window) of the air-fuel ratio that allows simultaneous purification of the three pollutants at high efficiency is relatively narrow.

Accordingly, during the normal operation of the engine, air-fuel ratio control (stoichiometric control) for controlling the air-fuel ratio of the exhaust gas flowing into the upstream catalyst 18 to the vicinity of the stoichiometric air-fuel ratio is executed by the ECU 100. The air-fuel ratio control includes main air-fuel ratio control (main air-fuel ratio feedback control) that controls, through feedback, the air-fuel ratio of the air-fuel mixture (specifically the fuel injection quantity) such that the exhaust air-fuel ratio detected by the pre-catalyst sensor 20 corresponds to the stoichiometric air-fuel ratio as a predetermined target air-fuel ratio, and auxiliary air-fuel ratio control (auxiliary air-fuel ratio feedback control) that controls, through feedback, the air-fuel ratio of the air-fuel mixture (specifically the fuel injection quantity) such that the exhaust air-fuel ratio detected by the post-catalyst sensor 21 corresponds to the stoichiometric air-fuel ratio.

Thus, in the embodiment, the reference value of the air-fuel ratio is the stoichiometric air-fuel ratio, and the fuel injection quantity corresponding to the stoichiometric air-fuel ratio (referred to as a stoichiometric corresponding quantity) is the reference value of the fuel injection quantity. Note that the reference values of the air-fuel ratio and the fuel injection quantity may be set to other values.

The air-fuel ratio control is performed on a bank basis or for each bank. For example, the detected values of the pre-catalyst sensor 20 and the post-catalyst sensor 21 on the first bank B1 side are used only for the air-fuel ratio feedback control of the #1, #3, #5, and #7 cylinders belonging to the first bank B1, and are not used for the air-fuel ratio feedback control of the #2, #4, #6, and #8 cylinders belonging to the second bank B2. The same applies to the reverse. The air-fuel ratio control is executed as if there were two independent in-line four-cylinder engines. In addition, in the air-fuel ratio control, the same control amount is equally used for each of the cylinders belonging to the same bank.

There are cases where, for example, the failure of the injector 2 or the like occurs in at least one cylinder (especially one cylinder) of all cylinders and a variation in air-fuel ratio between the cylinders (imbalance) occurs. For example, the case described above is a case where, in the first bank B1, the fuel injection quantity of the #1 cylinder is increased to be larger than that of the #3, #5, and #7 cylinders due to a valve closing failure of the injector 2 and the air-fuel ratio of the #1 cylinder is significantly shifted further toward the rich side than the air-fuel ratio of the #3, #5, and #7 cylinders.

Even in this case, when a relatively large correction amount is applied by the above-described air-fuel feedback control, there are cases where the air-fuel ratio of total gas (exhaust gas after the joining) supplied to the pre-catalyst sensor 20 can be controlled to correspond to the stoichiometric air-fuel ratio. However, in terms of the air-fuel ratio of each cylinder, the air-fuel ratio of the #1 cylinder is significantly richer than the stoichiometric air-fuel ratio, the air-fuel ratio of the #3, #5, and #7 cylinders is leaner than the stoichiometric air-fuel ratio, and the stoichiometric air-fuel ratio is attained only as an overall air-fuel ratio, which is apparently inappropriate in terms of the emission. Consequently, in the embodiment, there is provided an apparatus for detecting the abnormal variation in air-fuel ratio between cylinders.

Herein, as an index value indicative of the degree of the variation in air-fuel ratio between cylinders, a value called an imbalance ratio is employed. The imbalance ratio is a value that indicates, when a fuel injection quantity shift occurs only in one of a plurality of cylinders, the ratio of the shift of the fuel injection quantity of the cylinder having the fuel injection quantity shift (imbalance cylinder) with respect to the fuel injection quantity of each of the other cylinders without the fuel injection quantity shift (balance cylinders), i.e., a reference injection quantity. When it is assumed that the imbalance ratio is IB (%), the fuel injection quantity of the imbalance cylinder is Qib, and the fuel injection quantity, i.e., the reference injection quantity of the balance cylinder is Qs, the imbalance ratio is represented by $IB=(Qib-Qs)/Qs\times 100$. As the imbalance ratio IB is larger, the shift of the fuel injection quantity of the imbalance cylinder with respect to that of the balance cylinder is larger, and the degree of the variation in air-fuel ratio is larger.

In the embodiment, the fuel injection quantity of a predetermined target cylinder is actively or forcibly changed (increased or reduced) and, based on values of rotational variations relating to the target cylinder before and after the change, the abnormality of the internal combustion engine, the abnormal variation in air-fuel ratio between cylinders of the internal combustion engine in particular is detected.

First, the rotational variation is described. The rotational variation means a change in engine rotation speed or crankshaft rotation speed, and can be represented by, e.g., a value described below. In the embodiment, it is possible to detect the rotational variation relating to each cylinder.

Figure 3:
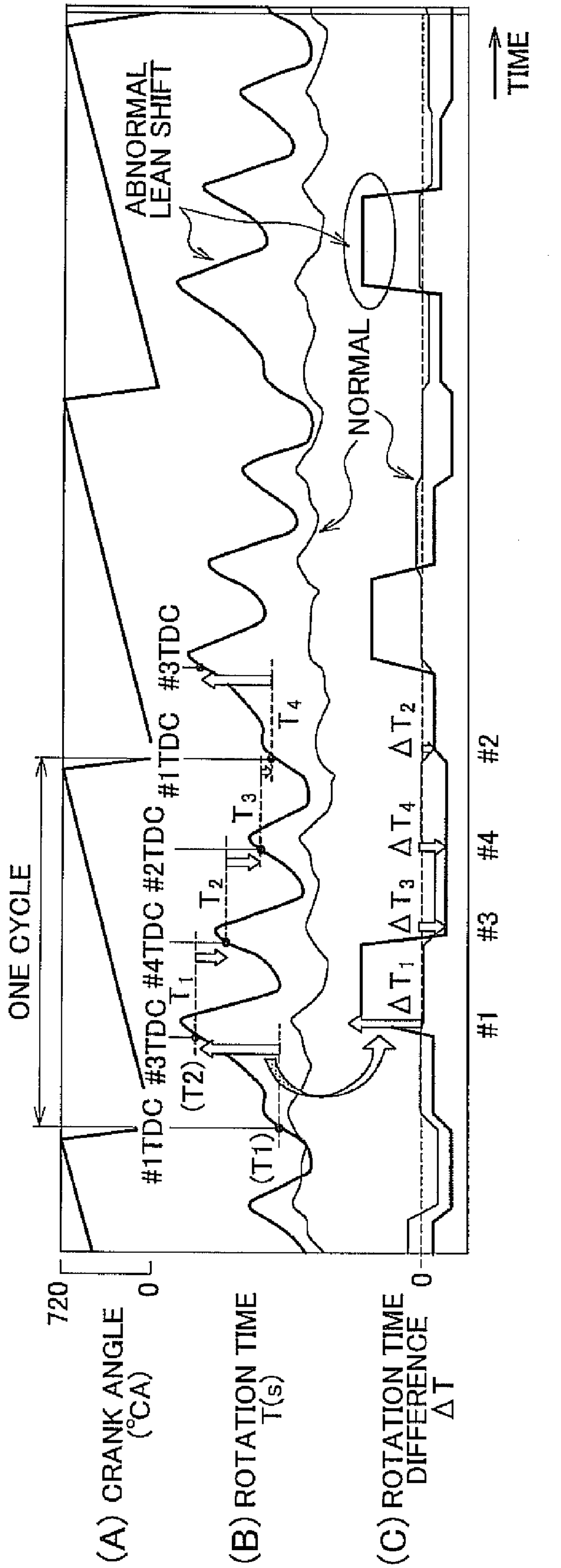
FIG. 3 is a time chart for explaining a value indicative of a rotational variation.

FIG. 3 shows a time chart for explaining the rotational variation. Although the example shown in the drawing is an example of an in-line four-cylinder engine, it is to be understood that the time chart is applicable to the V-type eight-cylinder engine as in the embodiment. The ignition is performed in the order of the #1 cylinder, #3 cylinder, #4 cylinder, and #2 cylinder.

In FIG. 3, a (A) part shows a crank angle (° CA) of the engine. One engine cycle corresponds to 720 (° CA), and crank angles of a plurality of cycles that are successively detected are shown in a saw tooth shape in the drawing.

A (B) part shows a time required for a crankshaft to rotate a predetermined angle, i.e., a rotation time T(s). Although the predetermined angle is 30 (° CA) in this example, the predetermined angle may also be set to other values (e.g., 10 (° CA)). As the rotation time T is longer, the engine rotation speed is lower and, conversely, as the rotation time T is shorter, the engine rotation speed is higher. The rotation time T is detected by the ECU 100 based on the output of the crank angle sensor 22.

A (C) part shows a rotation time difference ΔT that will be described later. In the drawing, "normal" indicates a normal case where the air-fuel ratio shift does not occur in any of cylinders, and "abnormal lean shift" indicates an abnormal case where lean shift of the imbalance ratio IB=−30(%) occurs only in the #1 cylinder. The abnormal lean shift can result from, e.g., nozzle hole clogging or an opening failure of the injector 2.

First, the rotation time T at the same timing for each of the cylinders is detected by the ECU. Herein, the rotation time T at the timing of top dead center (TDC) of each cylinder is detected. The timing when the rotation time T is detected is referred to as detection timing.

Next, at every detection timing, a difference between a rotation time T2 at the corresponding detection timing and a rotation time T1 at detection timing immediately before the corresponding detection timing (T2−T1) is calculated by the ECU. The difference corresponds to the rotation time difference ΔT shown in the (C) part, and the rotation time difference is represented by ΔT=T2−T1.

Usually, in the combustion stroke after the crank angle goes past the TDC, the rotation speed is increased so that the rotation time T is reduced and, in the subsequent compression stroke, the rotation speed is reduced so that the rotation time T is increased.

However, as shown in the (B) part, in a case where the #1 cylinder has the abnormal lean shift, even when the air-fuel mixture of the #1 cylinder is ignited, a sufficient torque cannot be obtained and the rotation speed is difficult to increase so that the rotation time T at the TDC of the #3 cylinder is thereby increased. Therefore, the rotation time difference ΔT at the TDC of the #3 cylinder has a large positive value as shown in the (C) part. The rotation time and the rotation time difference at the TDC of the #3 cylinder are set as the rotation time and the rotation time difference relating to the #1 cylinder, and are represented by $T_1$ and $\Delta T_1$, respectively. The same applies to the other cylinders.

Subsequently, since the #3 cylinder is normal, when the air-fuel mixture of #3 cylinder is ignited, the rotation speed is sharply increased. Thus, at the subsequent timing of the TDC of the #4 cylinder, the rotation time T is only slightly reduced as compared with that at the TDC of the #3 cylinder. Therefore, a rotation time difference $\Delta T_3$ relating to the #3 cylinder detected at the TDC of the #4 cylinder has a small negative value as shown in the (C) part. In this manner, the rotation time difference ΔT relating to a given cylinder is detected at the TDC of a cylinder of which the air-fuel mixture is subsequently ignited.

At the subsequent TDCs of the #2 and #1 cylinders as well, the similar tendency as that at the TDC of the #4 cylinder is seen, and a rotation time difference $\Delta T_4$ relating to the #4 cylinder and a rotation time difference $\Delta T_2$ relating to the #2 cylinder that are detected at both timings have small negative values. The characteristics described above are repeated every engine cycle.

Thus, it can be seen that the rotation time difference ΔT relating to each cylinder is a value indicative of the rotational variation relating to the cylinder, and is a value correlated to the air-fuel ratio shift amount of the cylinder. As a result, it is possible to use the rotation time difference ΔT relating to each cylinder as the index value indicating the rotational variation relating to the cylinder. As the air-fuel ratio shift amount of each cylinder is larger, the rotational variation relating to the cylinder is larger and the rotation time difference ΔT relating to the cylinder is also larger.

On the other hand, as shown in the (C) part of FIG. 3, in the normal case, the rotation time difference ΔT is constantly in the vicinity of 0.

Although the example of FIG. 3 shows the case of the abnormal lean shift, conversely, in the case of abnormal rich shift as well, i.e., in a case where large rich shift occurs only in one cylinder, the similar tendency is seen. This is because, in the case where the large rich shift occurs, even when the air-fuel mixture is ignited, the combustion becomes insufficient due to excessive fuel so that a sufficient torque cannot be obtained and the rotational variation is increased.

Figure 4:
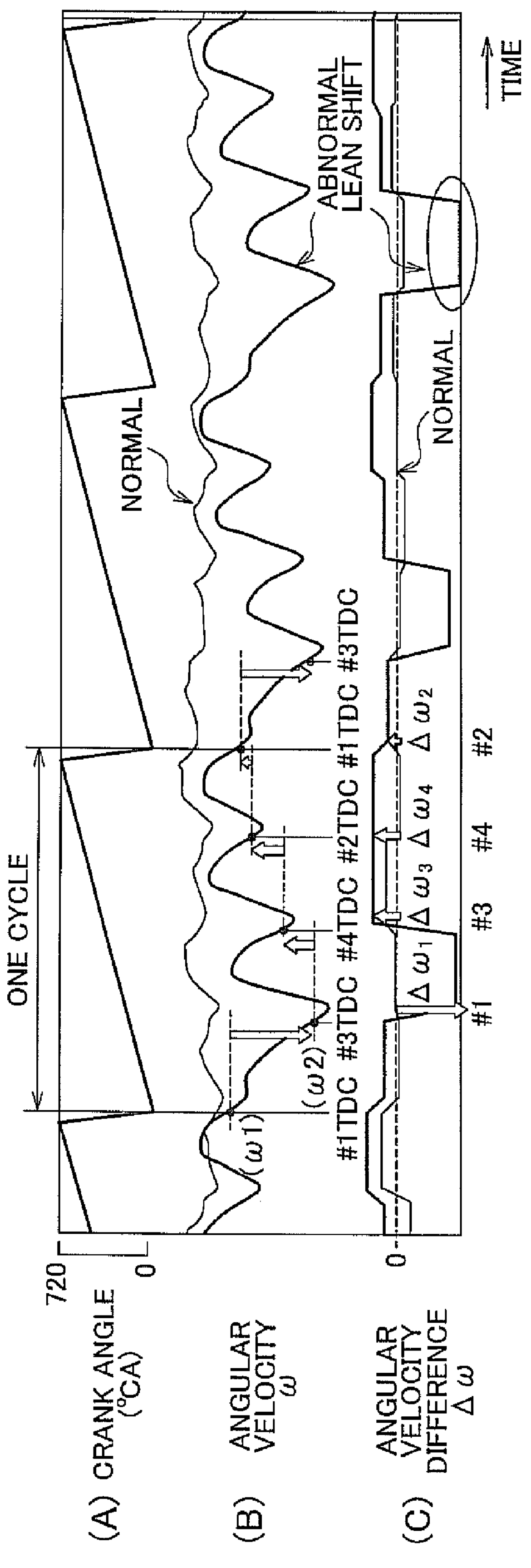
FIG. 4 is a time chart for explaining another value indicative of the rotational variation.

Next, with reference to FIG. 4, another value indicative of the rotational variation is described. Similarly to the (A) part of FIG. 3, a (A) part shows the crank angle (° CA) of the engine.

A (B) part shows an angular velocity ω (rad/s) as the inverse of the rotation time T. The angular velocity is represented by ω=1/T. Naturally, as the angular velocity ω is larger, the engine rotation speed is higher and, as the angular velocity ω is smaller, the engine rotation speed is lower. The waveform of the angular velocity ω is a form obtained by vertically inverting the waveform of the rotation time T.

A (C) part shows an angular velocity difference Δω as a difference in angular velocity ω, similarly to the rotation time difference ΔT. The waveform of the angular velocity difference Δω is also a form obtained by vertically inverting the waveform of the rotation time difference ΔT. In the drawing, "normal" and "abnormal lean shift" are the same as those in FIG. 3.

First, the angular velocity ω at the same timing for each of the cylinders is detected by the ECU. In this case as well, the angular velocity ω at the timing of TDC of each cylinder is detected. The angular velocity ω is calculated by dividing 1 by the rotation time T.

Next, at every detection timing, a difference between an angular velocity ω2 at the corresponding detection timing and an angular velocity ω1 at the detection timing immediately before the corresponding detection timing (ω2−ω1) is calculated by the ECU. The difference corresponds to the angular velocity difference Δω shown in the (C) part, and the angular velocity difference is represented by Δω=ω2−ω1.

Usually, in the combustion stroke after the crank angle goes past the TDC, the rotation speed is increased so that the angular velocity ω is increased and, in the subsequent compression stroke, the rotational speed is reduced so that the angular velocity ω is reduced.

However, as shown in the (B) part, in a case where the #1 cylinder has the abnormal lean shift, even when the air-fuel mixture of the #1 cylinder is ignited, a sufficient torque cannot be obtained and the rotation speed is difficult to increase so that the angular velocity ω at the TDC of the #3 cylinder is thereby reduced. Therefore, the angular velocity difference Δω at the TDC of the #3 cylinder has a large negative value as shown in the (C) part. The angular velocity and the angular velocity difference at the TDC of the #3 cylinder are set as the angular velocity and the angular velocity difference relating to the #1 cylinder, and are represented by $\omega_1$ and $\Delta\omega_1$, respectively. The same applies to the other cylinders.

Subsequently, since the #3 cylinder is normal, when the air-fuel mixture of the #3 cylinder is ignited, the rotation speed is sharply increased. Thus, at the subsequent timing at the TDC of the #4 cylinder, the angular velocity ω is only slightly increased as compared with that at the TDC of the #3 cylinder. Therefore, an angular velocity difference $\Delta\omega_3$ relating to the #3 cylinder detected at the TDC of the #4 cylinder has a small positive value as shown in the (C) part. In this manner, the angular velocity difference Δω relating to a given cylinder is detected at the TDC of a cylinder of which the air-fuel mixture is subsequently ignited.

At the subsequent TDCs of the #2 and #1 cylinders, the similar tendency as that at the TDC of the #4 cylinder is seen, and an angular velocity difference $\Delta\omega_4$ relating to the #4 cylinder and an angular velocity difference $\Delta\omega_2$ relating to the #2 cylinder that are detected at both timings have small positive values. The characteristics described above are repeated every engine cycle.

Thus, it can be seen that the angular velocity difference Δω relating to each cylinder is a value indicative of the rotational variation relating to the cylinder, and is a value correlated to the air-fuel ratio shift amount of the cylinder. As a result, it is possible to use the angular velocity difference Δω relating to each cylinder as the index value indicating the rotational variation relating to the cylinder. As the air-fuel ratio shift amount of each cylinder is larger, the rotational variation relating to the cylinder is larger and the angular velocity difference Δω relating to the cylinder is smaller (is larger in a minus direction).

On the other hand, as shown in the (C) part of FIG. 4, in the normal case, the angular velocity difference Δω is constantly in the vicinity of 0.

In the case of the abnormal rich shift opposite to abnormal lean shift, the similar tendency is seen, as described above.

Figure 5:
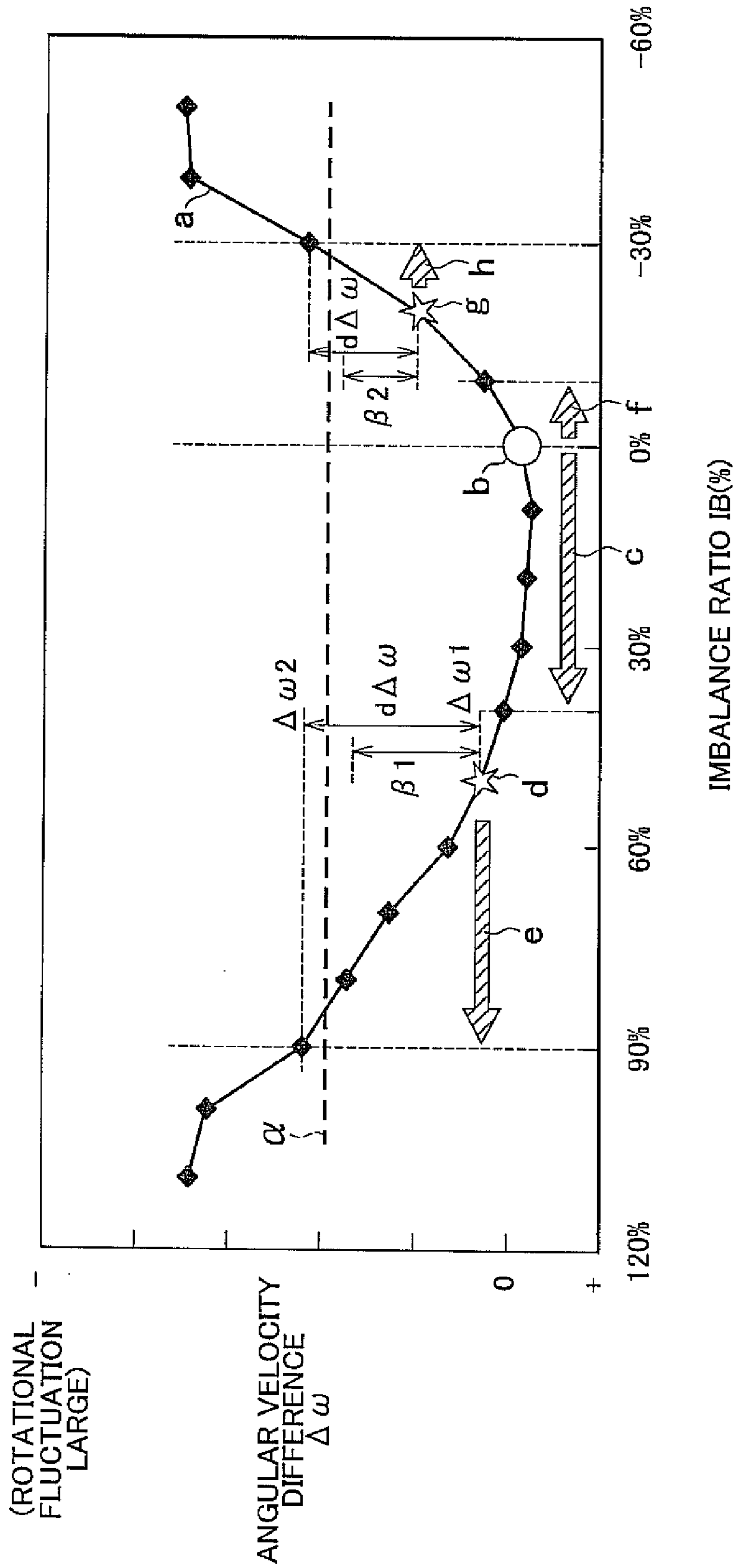
FIG. 5 is a graph showing a change in rotational variation when a fuel injection quantity is increased or reduced.

Next, a description is given of a change in rotational variation when the fuel injection quantity of one cylinder is actively increased or reduced with reference to FIG. 5.

In FIG. 5, the horizontal axis indicates the imbalance ratio IB, while the vertical axis indicates the angular velocity difference Δω as the index value indicating the rotational variation. Herein, the imbalance ratio IB of only one cylinder out of eight cylinders is changed and the relationship between the imbalance ratio IB of the one cylinder and the angular velocity difference Δω relating to the one cylinder is represented by a line a. The one cylinder is referred to as an active target cylinder. All of the other cylinders are balance cylinders and it is assumed that the stoichiometric corresponding quantity is injected as the reference injection quantity Qs in each of the balance cylinders.

In the horizontal axis, IB=0(%) Means a normal case where the imbalance ratio IB of the active target cylinder is 0(%) and the stoichiometric corresponding quantity is injected in the active target cylinder. Data in the normal case is shown by a plot b on the line a. When moving to the left side from the state of IB=0(%) in the drawing, the imbalance ratio IB is increased in a plus direction, and the fuel injection quantity is brought into an excessively large state, i.e., a rich state. Conversely, when moving to the right side from the state of IB=0(%) in the drawing, the imbalance ratio IB is increased in a minus direction, and the fuel injection quantity is brought into an excessively small state, i.e., a lean state.

As can be seen from the characteristic line a, when the imbalance ratio IB of the active target cylinder is increased from 0(%) in the plus direction or the minus direction, the rotational variation relating to the active target cylinder tends to be increased, and the angular velocity difference Δω relating to the active target cylinder tends to be increased from the vicinity of 0 in the Minus direction. In addition, as the imbalance ratio IB deviates from 0(%), the gradient of the characteristic line a tends to become steeper and a change in angular velocity difference Δω with respect to a change in imbalance ratio IB tends to be larger.

Herein, as indicated by an arrow c, it is assumed that the fuel injection quantity of the active target cylinder is forcibly increased from the stoichiometric corresponding quantity (IB=0(%)) by a predetermined quantity. In an example shown in the drawing, the fuel injection quantity is increased by the quantity equivalent to about 40(%) in terms of the imbalance ratio. At this point, in the vicinity of IB=0(%), the gradient of the characteristic line a is gentle, and hence the angular velocity difference Δω remains almost unchanged after the quantity increase and the difference in angular velocity difference Δω between before and after the quantity increase is extremely small.

On the other hand, as indicated by a plot d, consideration is given to a case where rich shift already occurs in the active target cylinder and its imbalance ratio IB has a relatively large pulse value. In the example shown in the drawing, the rich shift of about 50(%) in terms of the imbalance ratio occurs. When the fuel injection quantity of the active target cylinder in this state is forcibly increased by the same quantity as indicated by an arrow e, since the gradient of the characteristic line a is steep in this region, the angular velocity difference Δω after the quantity increase is significantly changed to the minus side as compared with that before the quantity increase, and the difference in angular velocity difference Δω between before and after the quantity increase is large. That is, by the quantity increase of the fuel injection quantity, the rotational variation relating to the active target cylinder is increased.

Therefore, on the basis of at least the angular velocity difference Δω relating to the active target cylinder after the quantity increase when the fuel injection quantity of the active target cylinder is forcibly increased by the predetermined quantity, it is possible to detect the abnormal variation.

That is, when the angular velocity difference Δω after the quantity increase is smaller than a predetermined negative abnormality determination value α as shown in the drawing (Δω<α), it is possible to determine that the abnormal variation is present, and identify the active target cylinder as an abnormal cylinder. Conversely, when the angular velocity difference Δω after the quantity increase is not smaller than the abnormality determination value α(Δω≥α), it is possible to determine that at least the active target cylinder is normal.

Alternatively, as shown in the drawing, on the basis of a difference dΔω in angular velocity difference Δω between before and after the quantity increase, it is possible to detect the abnormal variation, and the embodiment adopts this method. In this case, when it is assumed that the angular velocity difference before the quantity increase is Δω1 and the angular velocity difference after the quantity increase is Δω2, the difference dΔω between them can be defined as dΔω=Δω1−Δω2. When the difference Δω exceeds a predetermined positive abnormality determination value β1 (dΔω>β1), it is possible to determine that the abnormal variation is present, and identify the active target cylinder as the abnormal cylinder. Conversely, when the difference Δω does not exceed the abnormality determination value β1 (dΔω≤β1), it is possible to determine that at least the active target cylinder is normal.

The same can apply to a case where the forcible quantity reduction is performed in a region where the imbalance ratio is negative. As indicated by an arrow f, it is assumed that the fuel injection quantity of the active target cylinder is forcibly reduced from the stoichiometric corresponding quantity (IB=0(%)) by a predetermined quantity. In the example shown in the drawing, the fuel injection quantity is reduced by the quantity equivalent to about 10(%) in terms of the imbalance ratio. The reason why the reduction quantity is smaller than the increase quantity is that, when the fuel injection quantity of the cylinder having the abnormal lean shift is reduced by a large quantity, a misfire occurs in the cylinder. At this point, since the gradient of the characteristic line a is relatively gentle, the angular velocity difference Δω after the quantity reduction is only slightly smaller than that before the quantity reduction, and the difference in angular velocity difference Δω between before and after the quantity reduction is small.

On the other hand, as indicated by a plot g, consideration is given to a case where the lean shift already occurs in the active target cylinder and its imbalance ratio IB has a relatively large minus value. In the example shown in the drawing, the lean shift of about −20(%) in terms of the imbalance ratio occurs. When the fuel injection quantity of the active target cylinder in this state is forcibly reduced by the same quantity as indicated by an arrow h, since the gradient of the characteristic line a is relatively steep in this region, the angular velocity difference Δω after the quantity reduction is significantly changed to the minus side as compared with that before the quantity reduction, and the difference in angular velocity difference Δω between before and after the quantity reduction is large. That is, by the quantity reduction of the fuel injection quantity, the rotational variation relating to the active target cylinder is increased.

Therefore, on the basis of at least the angular velocity difference Δω relating to the active target cylinder after the quantity reduction when the fuel injection quantity of the active target cylinder is forcibly reduced by the predetermined quantity, it is possible to detect the abnormal variation.

That is, when the angular velocity difference Δω after the quantity reduction is smaller than the predetermined negative abnormality determination value α as shown in the drawing (Δω<α), it is possible to determine that the abnormal variation is present, and identify the active target cylinder as the abnormal cylinder. Conversely, when the angular velocity difference Δω after the quantity reduction is not smaller than the abnormality determination value α (Δω≥α), it is possible to determine that at least the active target cylinder is normal.

Alternatively, as shown in the drawing, it is also possible to detect the abnormal variation based on the difference dΔω in angular velocity difference Δω between before and after the quantity reduction, and the embodiment adopts this method. In this case as well, the difference dΔω between them can be defined as dΔω=Δω1−Δω2. When the difference dΔω exceeds a predetermined positive abnormality determination value β2 (dΔω>β2), it is possible to determine that the abnormal variation is present, and identify the active target cylinder as the abnormal cylinder. Conversely, when the difference dΔω does not exceed the abnormality determination value β2 (dΔω≤β2), it is possible to determine that at least the active target cylinder is normal.

Herein, since the increase quantity is significantly larger than the reduction quantity, the abnormality determination value β1 in the quantity increase is larger than the abnormality determination value β2 in the quantity reduction. However, both of the abnormality determination values can be arbitrarily set in consideration of the characteristics of the characteristic line a and a balance between the increase quantity and the reduction quantity. It is also possible to set both of the abnormality determination values to the same value.

It is to be understood that, when the rotation time difference ΔT is used as the index value indicating the rotational variation relating to each cylinder, it is possible to perform the abnormality detection and the identification of the abnormal cylinder by the similar method. In addition, it is also possible to use other values other than the above-described values as the index value relating to the rotational variation relating to each cylinder.

Figure 6:
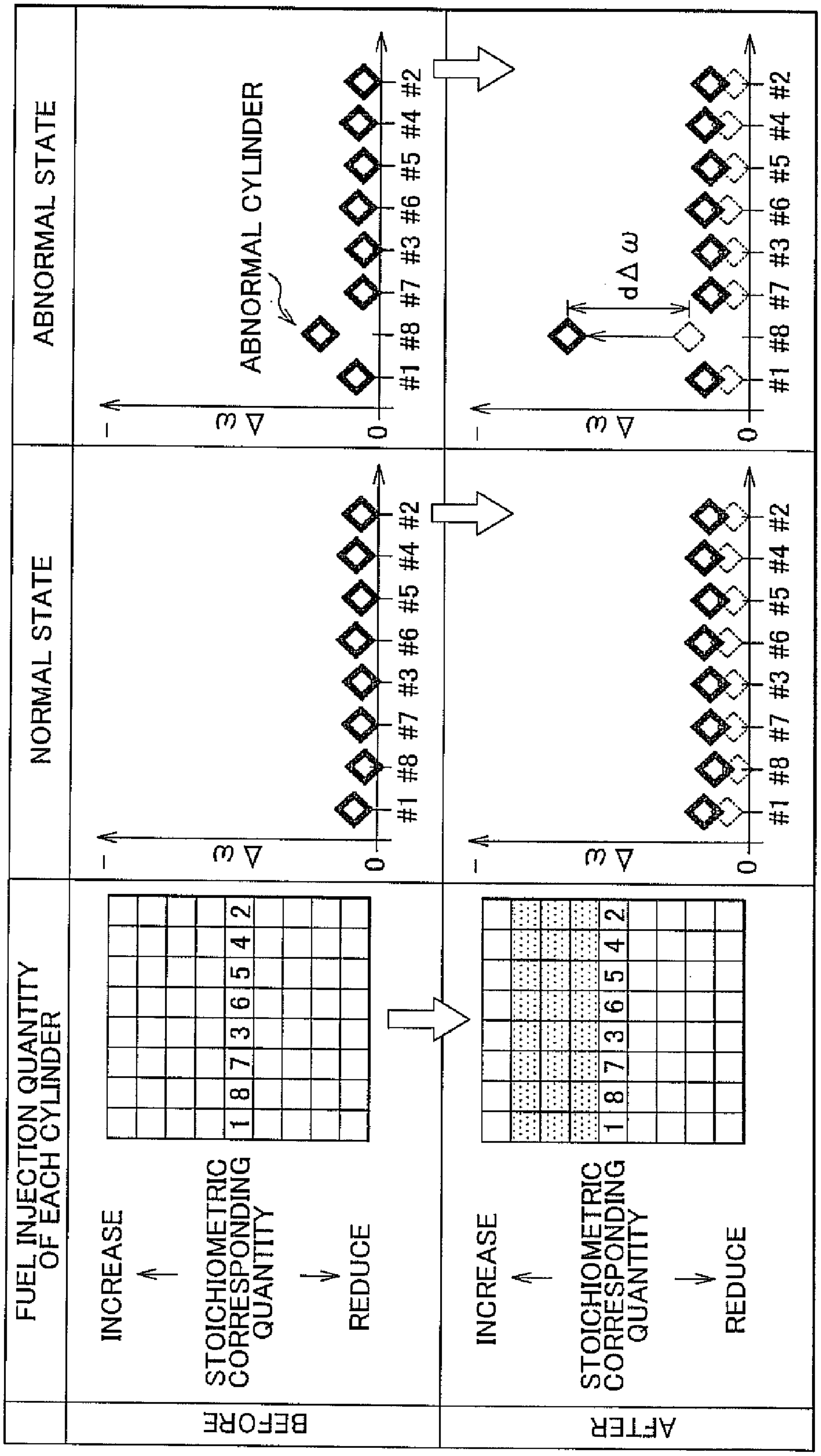
FIG. 6 is a view showing a quantity increase of the fuel injection quantity and a change in rotational variation before and after the quantity increase.

FIG. 6 shows the quantity increase of the fuel injection quantity of each of the eight cylinders and a change in the rotational variation relating to each cylinder before and after the quantity increase. The upper part shows data before the quantity increase, while the lower part shows data after the quantity increase. As shown in the left end column in a left-to-right direction, in a method of the quantity increase, the fuel injection quantity of each of all cylinders is equally and simultaneously increased by the same quantity. That is, all cylinders are predetermined target cylinders. Before the quantity increase, the injectors 2 of all cylinders are instructed to open valves such that the fuel in the stoichiometric corresponding quantity is injected and, after the quantity increase, the injectors 2 of all cylinders are instructed to open valves such that the fuel in the quantity larger than the stoichiometric corresponding quantity by a predetermined quantity is injected.

The quantity increase method includes a method in which the arbitrary number of cylinders are subjected to the quantity increase at a time, and the cylinders are subjected to the quantity increase in turn or alternately, in addition to the method in which all of the cylinders are simultaneously subjected to the quantity increase. For example, there is a method in which one cylinder is subjected to the quantity increase at a time, a method in which two cylinders are subjected to the quantity increase at a time, or a method in which four cylinders are subjected to the quantity increase at a time. The number of target cylinders to be subjected to the quantity increase at a time and cylinder numbers of the target cylinders to be subjected to the quantity increase can be arbitrarily set.

As the number of target cylinders is larger, there is an advantage that the total time required for the quantity increase can be reduced, but there is a disadvantage that the exhaust emission is deteriorated. Conversely, as the number of target cylinders is smaller, there is an advantage that the deterioration of the exhaust emission can be suppressed, but there is a disadvantage that the total time required for the quantity increase is prolonged.

As the index value indicating the rotational variation relating to each cylinder, similarly to FIG. 5, the angular velocity difference $\Delta\omega$ is used.

For example, in a normal state shown in the central column in the left-to-right direction, i.e., in a case where the abnormal air-fuel ratio shift does not occur in any of the cylinders, the angular velocity differences $\Delta\omega$ relating to all cylinders are substantially equally in the vicinity of 0 before the quantity increase, and the rotational variations relating to all cylinders are small. In addition, even after the quantity increase, the angular velocity differences $\Delta\omega$ relating to, all cylinders are substantially equally increased in the minus direction slightly, and the rotational variations relating to all cylinders are not significantly increased. Therefore, the difference $d\Delta\omega$ in angular velocity difference between before and after the quantity increase is small in each cylinder.

However, in an abnormal state shown in the right end column in the left-to-right direction, a behavior different from that in the normal state is exhibited. In the abnormal state, the abnormal rich shift equivalent to 50% in terms of the imbalance ratio occurs only in the #8 cylinder, and only the #8 cylinder is the abnormal cylinder. In this case, before the quantity increase, the angular velocity differences $\Delta\omega$ relating to the cylinders other than the #8 cylinder are substantially equally in the vicinity of 0, while the angular velocity difference $\Delta\omega$ relating to the #8 cylinder is slightly larger than the angular velocity differences $\Delta\omega$ relating to the other cylinders in the minus direction.

Nevertheless, there is not much difference between the angular velocity difference $\Delta\omega$ relating to the #8 cylinder and the angular velocity differences $\Delta\omega$ relating to the other cylinders. Therefore, depending on the angular velocity difference $\Delta\omega$ before the quantity increase, it is not possible to perform the abnormality detection and the identification of the abnormal cylinder with sufficient accuracy.

On the other hand, after the quantity increase, while the angular velocity differences $\Delta\omega$ relating to the other cylinders are only substantially equally changed slightly in the minus direction as compared with those before the quantity increase, the angular velocity difference $\Delta\omega$ relating to the #8 cylinder is significantly changed in the minus direction. Consequently, the difference $d\Delta\omega$ in angular velocity difference relating to the #8 cylinder between before and after the quantity increase becomes significantly larger than the differences $d\Delta\omega$ relating to the other cylinders. Therefore, by utilizing the difference, it is possible to perform the abnormality detection and the identification of the abnormal cylinder with sufficient accuracy.

In this case, only the difference $d\Delta\omega$ relating to the #8 cylinder is larger than the abnormality determination value $\beta 1$, and hence it is possible to detect the presence of the abnormal rich shift in the #8 cylinder.

It is to be understood that the similar method can be adopted also in a case where the fuel injection quantity is forcibly reduced to thereby detect the presence of the abnormal lean shift in any of the cylinders.

The foregoing is a basis of the detection of the abnormal variation in the embodiment. Hereinbelow, the angular velocity difference $\Delta\omega$ is used as the index value indicating the rotational variation relating to each cylinder unless particularly stated.

As described above, when the fuel injection quantity is forcibly changed in the detection of the abnormal variation, there is a case where the operation condition of the internal combustion engine is changed from that before the change. In this case, values of the rotational variations detected before and after the change are values detected under different operation conditions, and the abnormality detection based on the values may not be performed with sufficient accuracy.

For example, when the fuel injection quantity is forcibly increased, the output torque of the engine is increased by the quantity increase, and hence there is a case where the number of revolutions of the engine is increased to be larger than that before the quantity increase. Conversely, when the fuel injection quantity is forcibly reduced, the output torque of the engine is reduced, and hence there is a case where the number of revolutions of the engine is reduced to be lower than that before the quantity reduction. There is also a case where the same phenomenon occurs in an engine load.

Thus, since the operation condition after the change of the fuel injection quantity is different from that before the change, the comparison between the rotational variations may not be made under the same operation condition and the detection accuracy may be lowered.

To cope with this, in the embodiment, in order to secure sufficient detection accuracy, countermeasures described below are taken.

First Example

In a first example of the embodiment, each of the values of the rotational variations relating to the target cylinder detected before and after the change of the fuel injection quantity is corrected based on at least one of the number of revolutions of the engine and the engine load at a corresponding detection time.

More specifically, each of the values of the rotational variations relating to the target cylinder detected before and after the change of the fuel injection quantity is corrected so that each of the values matches with a value obtained on the assumption that at least one of the number of revolutions of the engine and the engine load at the corresponding detection time is equal to a predetermined standard value. This is what is called standardization.

Hereinbelow, this point is described. First, in the first example, correction is performed based on both of the number of revolutions Ne and a load KL of the engine. The load KL has values from 0 to 100(%), and can also be referred to as a load factor. Note that the correction may be performed based on only one of the number of revolutions Ne and the load KL.

A two-dimensional map (the two-dimensional map may also be a function. The same applies to the two-dimensional map shown below) that defines the relationship between the number of revolutions Ne and the load KL, and a correction coefficient J is pre-stored in the ECU 100. The map is created by adjustment through tests. In the map, the value of the correction coefficient J corresponding to each number of revolutions and each load is inputted.

The correction coefficient J is a value by which the detected rotational variation, i.e., the angular velocity difference Δω is multiplied. Herein, although the correction is performed by the multiplication, the correction may also be performed by addition or the like.

The correction coefficient J is a value used to correct the actually detected angular velocity difference Δω such that the angular velocity difference Δω matches with a value obtained on the assumption that the number of revolutions Ne and the load KL at the detection time (i.e., at the time of detection of the angular velocity difference Δω, that is, at the time at which the angular velocity difference Δω is detected) are equal to predetermined standard values. Herein, the standard value of the number of revolutions (standard number of revolutions) is assumed to be Nes=600 (rpm) and the standard value of the load (standard load) is assumed to be KLs=15(%). As the standard number of revolutions Nes and the standard load KLs, values during an idling operation may be set. However, these values may be arbitrarily set. A state where the number of revolutions Ne and the load KL are equal to the standard values is referred to as a standard state.

For example, when the angular velocity difference Δω detected under the operation condition in a non-standard state where Ne=800 (rpm) and KL=20(%) are satisfied is multiplied by the correction coefficient J determined from the map in accordance with the same condition, the angular velocity difference Δω is corrected into a value in the standard state. In this manner, even when the operation condition is changed, it is possible to constantly correct the angular velocity difference Δω into the value in the standard state to perform standardization, calculate the difference in rotational variation under the same condition, make the comparison between the rotational variations, and secure sufficient detection accuracy. It is also possible to prevent erroneous detection.

Figure 7:
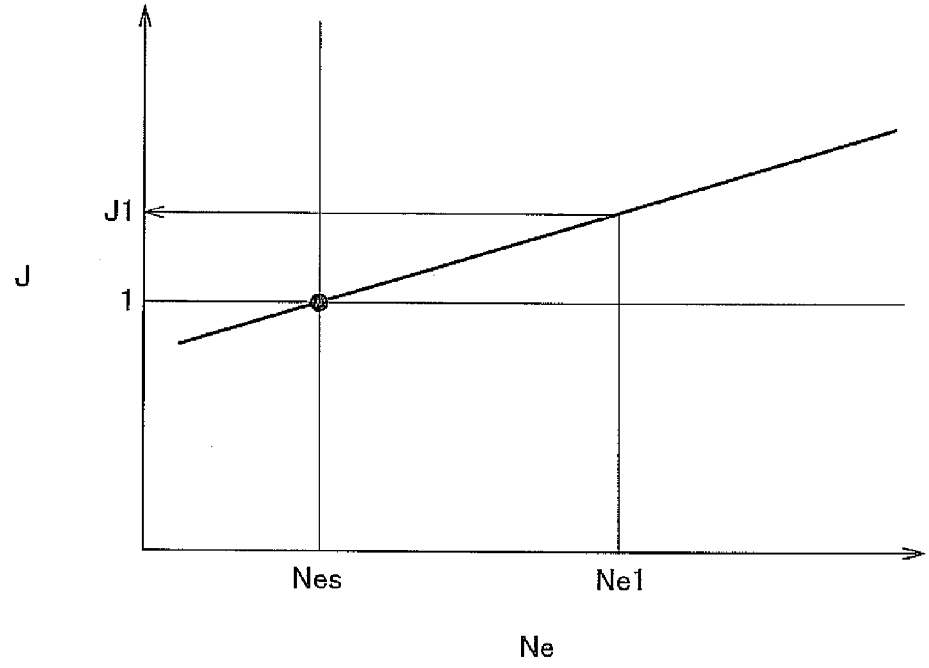
FIG. 7 shows an example of a map according to a first example.
Figure 8:
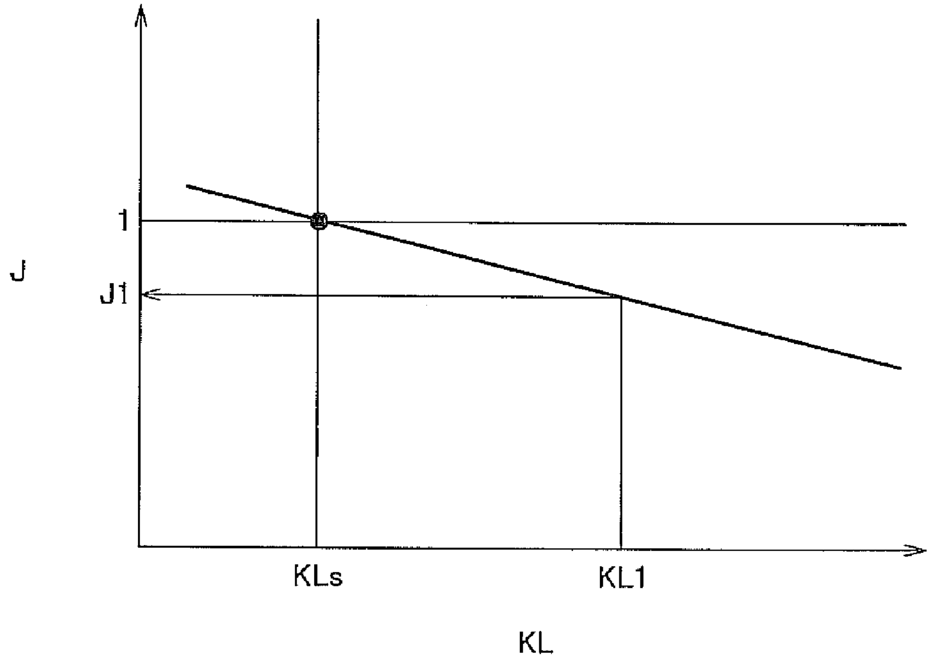
FIG. 8 shows an example of a map according to the first example.

FIGS. 7 and 8 show examples of the map. FIG. 7 shows the relationship between the number of revolutions Ne and the correction coefficient J when the load KL is a constant value.

As shown in FIG. 7, the correction coefficient J is 1 (no correction) when the number of revolutions Ne is the standard number of revolutions Nes. As the number of revolutions Ne increases from the standard number of revolutions Nes, the correction coefficient J is increased from 1 and, as the number of revolutions Ne decreases from the standard number of revolutions Nes, the correction coefficient J is decreased from 1. The reason for this setting is as follows.

As the number of revolutions Ne increases, the rotational variation tends to become smaller. Therefore, in order to correct the rotational variation into the standard state, it is necessary to perform the correction such that the value of the rotational variation is increased as the number of revolutions Ne increases from the standard number of revolutions Nes. For example, as shown in the drawing, when the number of revolutions at the time of detection of the angular velocity difference Δω is Ne1 that is higher than the standard number of revolutions Nes, the correction coefficient of J1 that is larger than 1 is determined, the detected angular velocity difference Δω is multiplied by J1, and the detected angular velocity difference Δω is corrected so as to be larger.

On the other hand, FIG. 8 shows the relationship between the load KL and the correction coefficient J when the number of revolutions Ne is a constant value.

As shown in FIG. 8, the correction coefficient J is 1 (no correction) when the load KL is the standard load KLs. As the load KL increases from the standard load KLs, the correction coefficient J is decreased from 1 and, as the load KL decreases from the standard load KLs, the correction coefficient J is increased from 1. The reason for this setting is as follows.

As the load KL increases, the rotational variation tends to be larger. Therefore, in order to correct the rotational variation into the standard state, it is necessary to perform the correction such that the value of the rotational variation is decreased as the load KL increases from the standard load KLs. For example, as shown in the drawing, when the load at the time of detection of the angular velocity difference Δω is KL1 that is larger than the standard load KLs, the correction coefficient of J1 that is smaller than 1 is determined, the detected angular velocity difference Δω is multiplied by J1, and the detected angular velocity difference Δω is corrected so as to be smaller.

Figure 9:
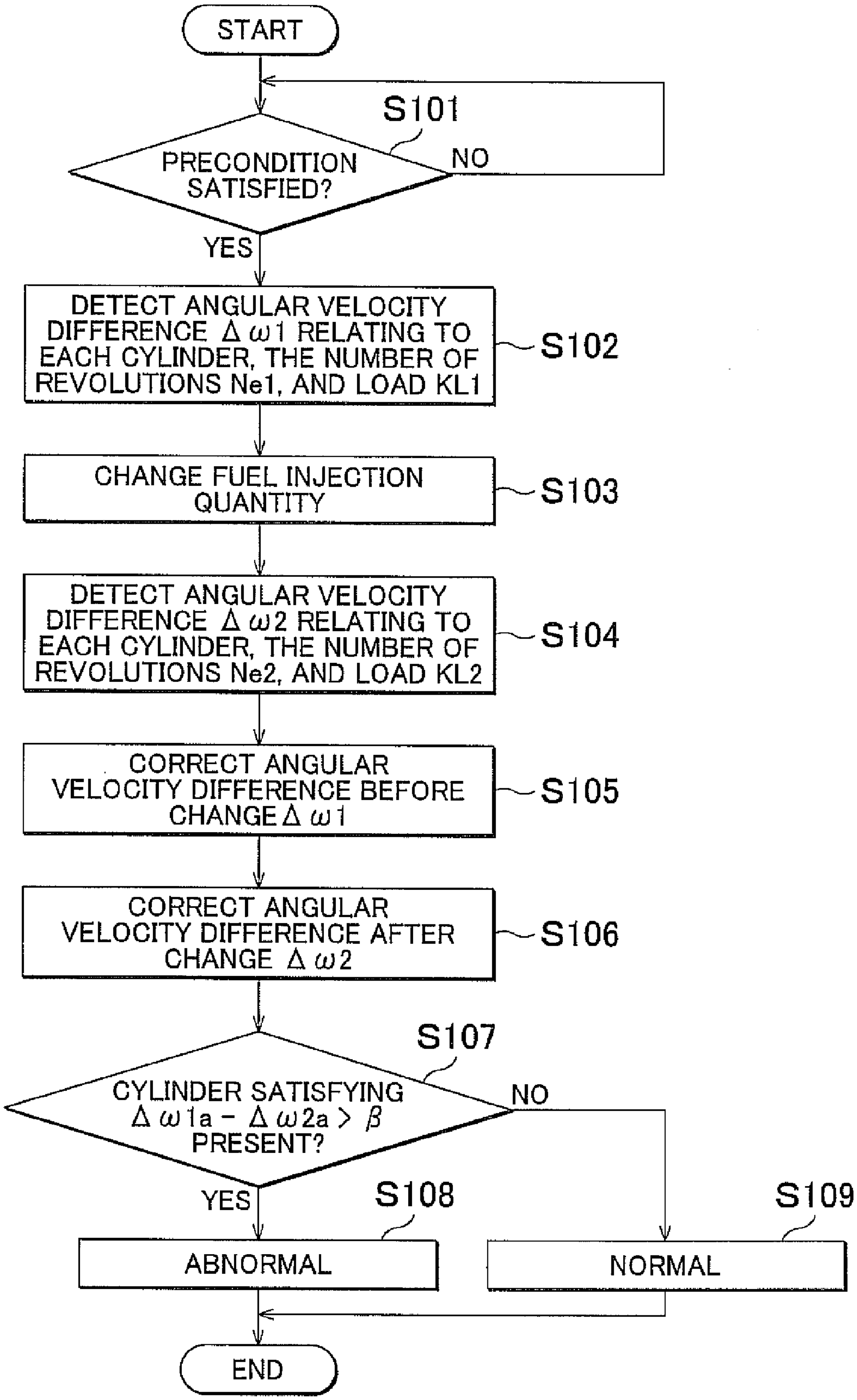
FIG. 9 is a flowchart showing an abnormality detection routine of the first example.

FIG. 9 shows an abnormality detection routine of the first example. The routine is executed by the ECU 100.

First, in Step S101, it is determined whether or not predetermined preconditions required for performing the abnormality detection are satisfied. The preconditions include conditions such as a condition that warming up of the engine is completed, a condition that the engine is in a steady operation, and a condition that the number of revolutions Ne and the load KL of the engine are within predetermined detection regions. Note that a condition that the engine is in the idling operation may also be included. In this case, the abnormality detection is performed during the idling operation. However, the preconditions are not limited to the example described above. The abnormality detection may be performed during the running of a vehicle other than during the idling operation.

When the preconditions are not satisfied, a standby state is established and, when the preconditions are satisfied, the routine advances to Step S102.

In Step S102, an angular velocity difference Δω1 before the change of the fuel injection quantity is detected for each of all cylinders. Subsequently, the number of revolutions Ne1 and the load KL1 at this time are detected. Note that the angular velocity difference Δω1 relating to each cylinder may be a value obtained by simply averaging values of a plurality of samples (e.g., 100 samples) relating to the cylinder. In addition, the number of revolutions Ne1 and the load KL1 may also be average values during the detection of the plurality of samples.

Next, in Step S103, the fuel injection quantity is changed. Then, during the change, in Step 104, an angular velocity difference Δω2 after the change of the fuel injection quantity is detected for each of all cylinders, and the number of revolutions Ne2 and a load KL2 at this time are also detected. Note that, similarly to Step S102, the angular velocity difference Δω2 relating to each cylinder may be a value obtained by simply averaging values of a plurality of samples (e.g., 100 samples) relating to the cylinder. In addition, the number of revolutions Ne2 and the load KL2 may also be average values during the detection of the plurality of samples.

Subsequently, in Step S105, the angular velocity differences Δω1 relating to all cylinders before the change of the fuel injection quantity are corrected. That is, the correction coefficient J1 corresponding to the number of revolutions Ne1 and the load KL1 detected in Step S102 is calculated from the map, each of the angular velocity differences Δω1 relating to all cylinders is multiplied by the correction coefficient J1, and the angular velocity differences Δω1 relating to all cylinders are thereby corrected. An angular velocity difference Δω1a is determined from Δω1a=J1×Δω1.

Then, in Step S106, the angular velocity differences Δω2 of all cylinders after the change of the fuel injection quantity are corrected. That is, a correction coefficient J2 corresponding to the number of revolutions Ne2 and the load KL2 detected in Step S104 is calculated from the map, each of the angular velocity differences Δω2 of all cylinders is multiplied by the correction coefficient J2, and the angular velocity differences Δω2 of all cylinders are thereby corrected. An angular velocity difference Δω2a after the correction is determined from Δω2a=J2×Δω2.

Next, in Step S107, a difference in angular velocity difference after the correction between before and after the change of the fuel injection quantity dΔωa=Δω1a−Δω2a is calculated for each of all cylinders. Subsequently, it is determined whether or not a cylinder relating to the difference dΔωa of more than an abnormality determination value β (>0) is present. When it is determined that the cylinder relating to the difference dΔωa of more than the abnormality determination value β is present, in Step S108, it is determined that the abnormal variation in air-fuel ratio between the cylinders, i.e., the abnormal air-fuel ratio shift is present, and the cylinder relating to the difference dΔωa of more than the abnormality determination value β is identified as the abnormal cylinder.

On the other hand, when it is determined that the cylinder relating to the difference dΔωa of more than the abnormality determination value β is not present, in Step S109, it is determined that all cylinders are normal and determined that the abnormal variation in air-fuel ratio between the cylinders, i.e., the abnormal air-fuel ratio shift is not present.

Note that, although the "quantity increase" and the "quantity reduction" of the fuel injection quantity is collectively described as the "change", when the detection of the abnormal rich shift by the quantity increase and the detection of the abnormal lean shift by the quantity reduction are separately and individually performed, the above-described routine may appropriately be executed twice in the case where the quantity is increased and in the case where the quantity is reduced.

Second Example

Next, a second example of the embodiment is described. In the second example, the values of the rotational variations relating to the target cylinder detected before and after the change of the fuel injection quantity are normalized based on a value of a criterion rotational variation that corresponds to at least one of the number of revolutions and the load of the engine during each detection.

Hereinbelow, this point is described. First, in the second example, normalization is performed based on the value of the rotational variation equivalent to the criterion, which corresponds to both of the number of revolutions Ne and the load KL of the engine. Note that the normalization may also be performed based on the value of the rotational variation equivalent to the criterion, which corresponds to only one of the number of revolutions Ne and the load KL. Hereinafter, the rotational variation equivalent to the criterion is referred to as a "criterion rotational variation". In addition, in the second example, the angular velocity difference Δω is used as the value of the rotational variation, and hence a criterion angular velocity difference Δω is referred to as a "criterion angular velocity difference", and is represented by Δωc.

The criterion is a value that defines the boundary between normality and abnormality, and the criterion rotational variation and the criterion angular velocity difference are a rotational variation and an angular velocity difference that define the boundary between the normality and the abnormality. In the second example, according to the example of FIG. 5, the rotational variation and the angular velocity difference Δω at the plot d, i.e., when IB=50% is satisfied in a region where IB>0 is satisfied, i.e., on the rich side are set as the criterion rotational variation and the criterion angular velocity difference Δωc.

On the other hand, the rotational variation and the angular velocity difference Δω at the plot g, i.e., when IB=−20% is satisfied in a region where IB<0 is satisfied, i.e., on the lean side are set as the criterion rotational variation and the criterion angular velocity difference Δωc. Note that the values of the criterion rotational variation and the criterion angular velocity difference Δωc are arbitrarily set and, for example, the rotational variation and the angular velocity difference corresponding to IB=60% or −30% may also be set as the criterion rotational variation and the criterion angular velocity difference Δωc.

A two-dimensional map that defines the relationship between the number of revolutions Ne and the load KL, and the criterion angular velocity difference Δωc is pre-stored in the ECU 100. The map is created by adjustment through tests. In the map, the value of the criterion angular velocity difference Δωc corresponding to each number of revolutions and each load is inputted.

In general, the values of the rotational variation and the angular velocity difference differ according to the number of revolutions and the load. Therefore, the value of the criterion angular velocity difference Δωc corresponding to each number of revolutions and each load is determined through tests and inputted in the map.

The normalization is performed by dividing the actually detected angular velocity difference Δω by the criterion angular velocity difference Δωc corresponding to the number of revolutions Ne and the load KL at the detection time. When the angular velocity difference after the normalization is ΔΩ, the angular velocity difference is represented by ΔΩ=Δω/Δωc. The criterion angular velocity difference Δωc corresponding to the number of revolutions Ne and the load KL at the detection time is calculated from the map.

Figure 10:
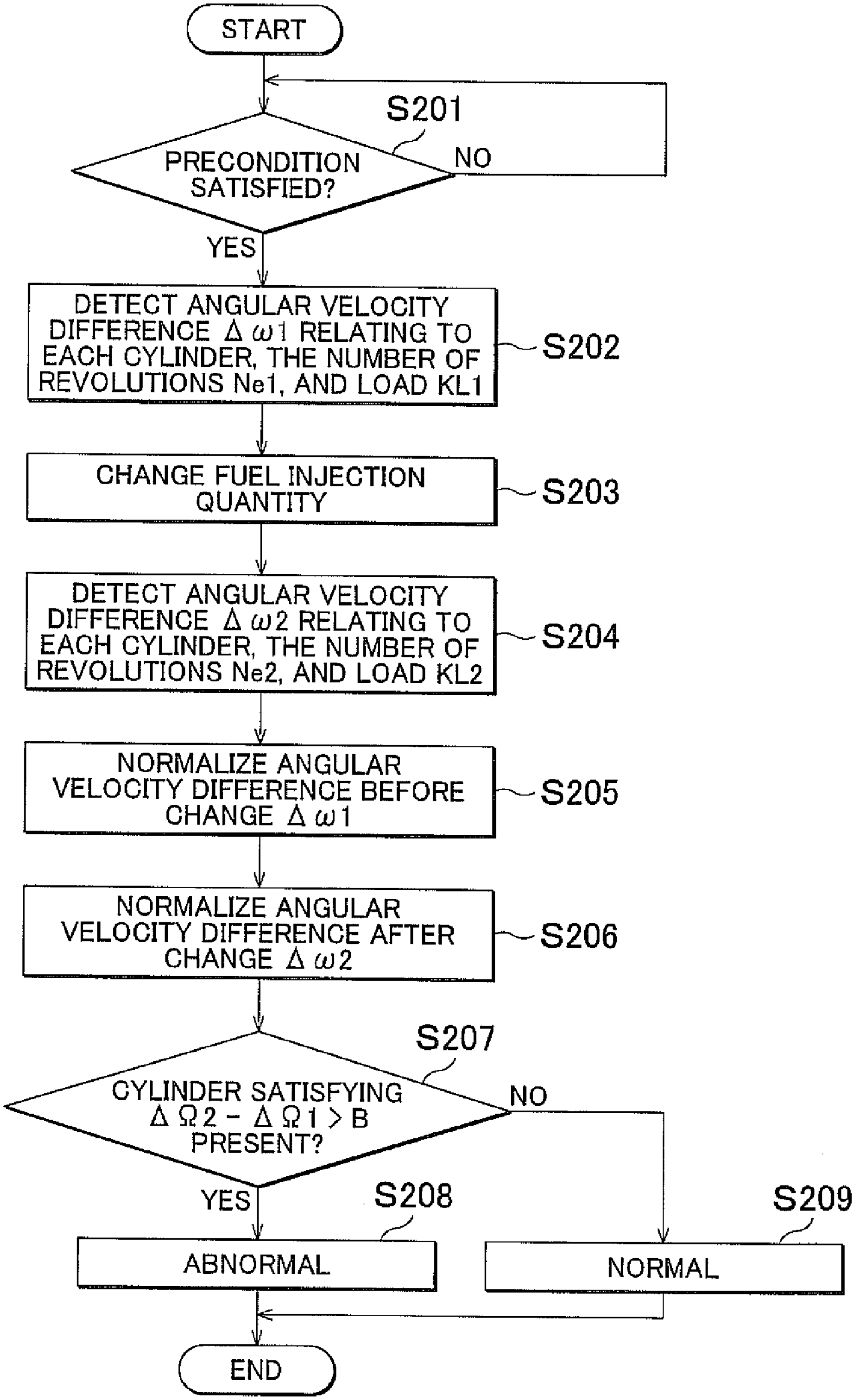
FIG. 10 is a flowchart showing an abnormality detection routine of a second example.

FIG. 10 shows an abnormality detection routine of the second example. This routine is executed by the ECU 100.

Steps S201 to S204 are the same as Steps S101 to S104 described above. In the next Step S205, the angular velocity differences Δω1 relating to all cylinders before the change of the fuel injection quantity are normalized. That is, a criterion angular velocity difference Δωc1 corresponding to the number of revolutions Ne1 and the load KL1 detected in Step S202 is calculated from the map, each of the angular velocity differences Δω1 relating to all cylinders is divided by the criterion angular velocity difference Δωc1, and the angular velocity differences Δω1 relating to all cylinders are thereby normalized. An angular velocity difference after the normalization ΔΩ1 is determined from ΔΩ1=Δω1/Δωc1.

Next, in Step S206, the angular velocity differences Δω2 relating to all cylinders after the change of the fuel injection quantity are normalized. That is, a criterion angular velocity difference Δωc2 corresponding to the number of revolutions. Ne2 and the load KL2 detected in Step S204 is calculated from the map, each of the angular velocity differences Δω2 relating to all cylinders is divided by the criterion angular velocity difference Δωc2, and the angular velocity differences Δω2 relating to all cylinders are thereby normalized. An angular velocity difference after the normalization ΔΩ2 is determined from ΔΩ2=Δω2/Δωc2.

Subsequently, in Step S207, a difference in angular velocity difference after the normalization between before and after the change of the fuel injection quantity dΔΩ=ΔΩ2−ΔΩ1 is calculated for each of all cylinders. Then, it is determined whether or not a cylinder relating to the difference dΔΩ of more than an abnormality determination value B (>0) is present. When it is determined that the cylinder relating to the difference dΔΩ of more than the abnormality determination value B is present, in Step S208, it is determined that the abnormal variation in air-fuel ratio between the cylinders, i.e., the abnormal air-fuel ratio shift is present, and the cylinder relating to the difference dΔΩ of more than the abnormality determination value B is identified as the abnormal cylinder.

On the other hand, when it is determined that the cylinder relating to the difference dΔΩ of more than the abnormality determination value B is not present, in Step S209, it is determined that all cylinders are normal, and it is determined that the abnormal variation in air-fuel ratio between the cylinders, i.e., the abnormal air-fuel ratio shift is not present.

Note that, although the "quantity increase" and the "quantity reduction" of the fuel injection quantity are also collectively described as the "change", when the detection of the abnormal rich shift by the quantity increase and the detection of the abnormal lean shift by the quantity reduction are separately and individually performed, the above-described routine may appropriately be executed twice in the case where the quantity is increased and in the case where the quantity is reduced.

Herein, the point to which attention should be paid is that the difference in angular velocity difference after the normalization between before and after the change of the fuel injection quantity dΔΩ=ΔΩ2−ΔΩ1 is the opposite of the case of the above-described basic example or the first example, i.e., the difference is a value obtained by subtracting the value before the change ΔΩ1 from the value after the change ΔΩ2. The criterion angular velocity difference Δωc is a negative value and the sign of the angular velocity difference Δω is changed from the negative sign to the positive sign by the normalization, and hence, in correspondence to this, the difference relation is reversed. Thus, similarly to the above-described basic example and first example, it is possible to use the positive abnormality determination value B.

The individual values obtained by the above-described normalization and abnormality detection routine are schematically described. Herein, as an example, a description is given of a case where the fuel injection quantity is changed to the rich side, i.e., the fuel injection quantity is increased. In the following description, please refer to FIG. 5 as necessary.

When the target cylinder is normal, the angular velocity difference Δω1 relating to the target cylinder before the quantity increase of the fuel injection quantity is smaller in absolute value than the criterion angular velocity difference Δωc1. Therefore, the angular velocity difference after the normalization ΔΩ1=Δω1/Δωc1 is smaller than 1. In addition, the angular velocity difference Δω2 relating to the target cylinder after the quantity increase of the fuel injection quantity is not significantly different from that before the quantity increase so that the angular velocity difference Δω2 is smaller in absolute value than the criterion angular velocity difference Δωc2. Therefore, the angular velocity difference after the normalization ΔΩ2=Δω2/Δωc2 is also smaller than 1. Therefore, the difference in angular velocity difference after the normalization between before and after the quantity increase dΔΩ=ΔΩ2−ΔΩ1 is a value that is almost 0 and does not exceed the positive abnormality determination value B.

Next, when the target cylinder is at the criterion, i.e., at the boundary between the normality and the abnormality, the angular velocity difference Δω1 relating to the target cylinder before the quantity increase of the fuel injection quantity is equal to the criterion angular velocity difference Δω1. Therefore, the angular velocity difference after the normalization ΔΩ1=Δω1/Δωc1 is equal to 1. In addition, the angular velocity difference Δω2 relating to the target cylinder after the quantity increase of the fuel injection quantity becomes larger in absolute value than that before the quantity increase (changed to the minus side of FIG. 5) so that the angular velocity difference Δω2 is larger in absolute value than the criterion angular velocity difference Δωc2. Therefore, the angular velocity difference after the normalization ΔΩ2=Δω2/Δωc2 is larger than 1. Therefore, the difference in angular velocity difference after the normalization between before and after the quantity increase dΔΩ=ΔΩ2−ΔΩ1 is a positive value that is larger than 0, and is larger than the difference dΔΩ when the target cylinder is normal, and is equal to the positive abnormality determination value B. Conversely, the value equal to the difference dΔΩ is defined as the abnormality determination value B.

Subsequently, when the target cylinder is abnormal, the angular velocity difference Δω1 relating to the target cylinder before the quantity increase of the fuel injection quantity is larger in absolute value than the criterion angular velocity difference Δωc1. Therefore, the angular velocity difference after the normalization ΔΩ1=Δω1/Δωc1 is larger than 1. In addition, the angular velocity difference Δω2 relating to the target cylinder after the quantity increase of the fuel injection quantity becomes significantly larger in absolute value than that before the quantity increase (significantly changed to the minus side of FIG. 5). The increase amount at this point is larger than that at the criterion. Therefore, the angular velocity difference Δω2 is significantly larger in absolute value than the criterion angular velocity difference Δωc2. Therefore, the angular velocity difference after the normalization ΔΩ2=Δω2/Δωc2 is significantly larger than 1, and is considerably larger than the value at the criterion or before the quantity increase. Therefore, the difference in angular velocity difference after the normalization between before and after the quantity increase dΔΩ=ΔΩ2−ΔΩ1 is a positive value that is larger than 0, and is larger than the positive abnormality determination value B.

As described thus far, according to the second example, the value of the detected rotational variation is normalized based on the criterion rotational variation corresponding to the number of revolutions and the load at the detection time. Therefore, it is possible to eliminate an influence and an error resulting from differences in the number of revolutions and the load, from the value of the detected rotational variation, and to obtain the net precise value of the rotational variation. In addition, since the detection of the abnormal variation is performed based on the values of the rotational variations after the normalization (i.e., the normalized values of the rotational variations) before and after the change of the fuel injection quantity, it becomes possible to secure sufficient detection accuracy. It is also possible to prevent erroneous detection.

Although the embodiment of the invention has been described in detail thus far, various embodiments can be considered as the embodiment of the invention. For example, instead of using the difference dΔω between the angular velocity difference Δω1 before the quantity increase and the angular velocity difference AΔω2 after the quantity increase, the ratio between them can also be used. In this point, the same applies to the difference dΔω in angular velocity difference between before and after the quantity reduction, or the difference in rotation time difference ΔT between before and after the quantity increase or the quantity reduction. The invention is not limited to the V-type eight-cylinder engine, but can be applied to engines of other various types and engines with the other numbers of cylinders. As the post-catalyst sensor, the wide-range air-fuel ratio sensor similar to the pre-catalyst sensor may also be used. The above-described numerical values are examples, and can be appropriately changed.

The embodiment of the invention is not limited to the above-described embodiment and the invention includes all modifications, applications, and equivalents included in the scope of the invention defined by the scope of claims. Consequently, the invention should not be interpreted in a limited way and can be applied to any other technology included within the scope of the invention.

What is claimed is:

1. An abnormality detection apparatus for a multi-cylinder internal combustion engine, comprising:

an abnormality detection portion that changes a fuel injection quantity of a predetermined target cylinder in a range in which a misfire does not occur, and detects an abnormal air-fuel ratio shift of the target cylinder, based on rotational variations relating to the target cylinder detected before and after a change of the fuel injection quantity; and a correction portion that corrects each values of the rotational variations relating to the target cylinder detected before and after the change of the fuel injection quantity, based on at least one of an engine revolution number and an engine load at a corresponding detection time.

2. The abnormality detection apparatus for a multi-cylinder internal combustion engine according to claim 1, wherein the correction portion corrects each of the values of the rotational variations relating to the target cylinder detected before and after the change of the fuel injection quantity such that each of the values matches with a value obtained on an assumption that at least one of the engine revolution number and the engine load at the corresponding detection time is equal to a predetermined standard value.

3. The abnormality detection apparatus for a multi-cylinder internal combustion engine according to claim 1, wherein the correction portion executes correction based on at least the engine revolution number, and executes the correction such that, as a value of the engine revolution number at the time of detection of the rotational variation increases from a standard value thereof, the value of the detected rotational variation is increased.

4. The abnormality detection apparatus for a multi-cylinder internal combustion engine according to claim 1, wherein the correction portion executes correction based on at least the engine load, and executes the correction such that, as a value of the engine load at the time of detection of the rotational variation increases from a standard value thereof, the value of the detected rotational variation is decreased.

5. The abnormality detection apparatus for a multi-cylinder combustion engine according to claim 1, wherein the abnormality detection portion detects the abnormal air-fuel ratio shift of the target cylinder based on a difference between the rotational variations relating to the target cylinder before and after the change of the fuel injection quantity, after correction is executed by the correction portion.

* * * * *